United States Patent
Tateoka

(10) Patent No.: US 7,415,722 B2
(45) Date of Patent: Aug. 19, 2008

(54) SERVER COMPUTER PROTECTION APPARATUS AND METHOD FOR CONTROLLING DATA TRANSFER BY THE SAME

(75) Inventor: Masamichi Tateoka, Higashimurayama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 563 days.

(21) Appl. No.: 10/352,904

(22) Filed: Jan. 29, 2003

(65) Prior Publication Data

US 2003/0145236 A1 Jul. 31, 2003

(30) Foreign Application Priority Data

Jan. 30, 2002 (JP) ............... 2002-022486

(51) Int. Cl.
G06F 9/00 (2006.01)
G06F 15/16 (2006.01)
G06F 17/00 (2006.01)

(52) U.S. Cl. .................. 726/12; 713/171; 709/223; 709/224; 709/225

(58) Field of Classification Search .............. 726/12
See application file for complete search history.

(56) References Cited

U.S. PATENT DOCUMENTS

| | | | |
|---|---|---|---|
| 5,459,837 A | 10/1995 | Caccavale | |
| 6,006,264 A * | 12/1999 | Colby et al. | 709/226 |
| 6,442,608 B1 * | 8/2002 | Knight et al. | 709/225 |
| 6,693,905 B1 * | 2/2004 | Ishimura et al. | 370/389 |
| 6,789,203 B1 * | 9/2004 | Belissent | 726/22 |
| 6,799,276 B1 * | 9/2004 | Belissent | 726/14 |
| 2002/0138643 A1 * | 9/2002 | Shin et al. | 709/232 |

FOREIGN PATENT DOCUMENTS

| | | |
|---|---|---|
| JP | 2000-172620 | 6/2000 |
| JP | 2000-322365 | 11/2000 |
| JP | 2001-273209 | 10/2001 |
| WO | WO 02/01834 A | 3/2002 |

OTHER PUBLICATIONS

Jiang et al., "An Adaptive Network Prefetch Scheme", Apr. 1998, IEEE, vol. 16, No. 3, pp. 358-368, Retrived on Apr. 7, 2006 http://kabru.eecs.umich.edu/rtclonly/jsac/js1998/16sac03-jiang.pdf☐☐.*
Jiang, Zhimei et al., "An Adaptive Network Prefetch Scheme," IEEE Journal On Selected Areas In Communications, vol. 16, No. 3, Apr. 1998, pp. 358-368, XP-000740056.
Kanno et al.; "Server Computer Protection Apparatus, Method, Program Product, and Server Computer Apparatus"; U.S. Appl. No. 10/241,565, filed Sep. 12, 2002.

* cited by examiner

*Primary Examiner*—Emmanuel L Moise
*Assistant Examiner*—Shewaye Gelagay
(74) *Attorney, Agent, or Firm*—Finnegan, Henderson, Farabow, Garrett & Dunner, L.L.P.

(57) ABSTRACT

A threshold value outputting section has a server response measurement sub-section, a time-out counting sub-section, a suspension counting sub-section, and a threshold value counting sub-section, to variably set dynamically a threshold value of the number of times of the data request based on a condition of data requests suspended in the data request transmission section, a condition of a response sent from a server computer, etc. and then output this threshold value.

4 Claims, 3 Drawing Sheets

| Server's network address | Number of times of the data request that can be processed within one minute |
|---|---|
| 192.168.1.31 | 100 |
| 192.168.1.32 | 150 |

SERVER COMPUTER PROTECTION APPARATUS AND METHOD FOR CONTROLLING DATA TRANSFER BY THE SAME

CROSS-REFERENCE TO RELATED APPLICATIONS

This application is based upon and claims the benefit of priority from the prior Japanese Patent Application No. 2002-022486, filed Jan. 30, 2002, the entire contents of which are incorporated herein by reference.

BACKGROUND OF THE INVENTION

1. Field of the Invention

The present invention relates to, in a client server/system in which many unspecified or specified clients are connected through a packet switched network to at least one unit of server computer, a server computer protection apparatus and method for controlling data transfer by the same which is well suitable for use in the realization of a function to prevent or detect illicit access to the server computer.

2. Description of the Related Art

A client/server system is available, in which a packet switched network connects many specified or unspecified clients to at least one server computer. This system incorporates a server-protecting apparatus that can prevent or detect illicit accesses to the server computer. The server-protecting apparatus comprises a mechanism provided between and connected to the clients and the server computer. The mechanism monitors data requests that the server computer receives from any client. When any client transmits a data request to the server computer, the mechanism determines whether the server computer will be overloaded if it accepts the request, from the number of data request that the server computer received for a unit of time in a specific period in the past.

FIG. 1 is a system block diagram for showing a positional relationship among clients, a packet switched network, the server, and a server computer protection apparatus. The server computer protection apparatus has a function which, when the apparatus is connected between the client and the server, protects a web server from a hacker's attack thereto. Some of the hacker's attacks access the server at a time to thereby increase loads on the server itself, thus disabling it.

A configuration example of this type of conventional server computer protection apparatus is shown in FIG. 2. In FIG. 2, in the conventional configuration, a server computer protection apparatus 10 comprises network interfaces 11A and 11B and connection/transfer means 12. The connection/transfer means 12 is made up of data request reception means 13, data request transmission means 14, server data request measurement means 15, threshold value holding means 17, threshold value comparison means 16, etc.

The network interface 11A has a function to transmit a packet to and receive it from a client through a network segment (A).

The network interface 11B has a function to transmit a packet to and receive it from a server computer through a network segment (B) and a function to send a data request passed from the data request transmission means 14 to the server computer and receive data from the server computer.

In the connection/transfer means 12, the data request reception means 13 has a function to exchange a packet with the network interface 11A and receive a data request sent from a client on behalf of a server.

The data request transmission means 14 has a function to receive a comparison result from the threshold value comparison means 16 and, if the comparison result indicates that the number of times a data request has been received which is measured by the server data request measurement means 15 is not in excess of a threshold value held in the threshold value holding means 17, transfer through the network interface 11B the data request received by the data request reception means 13 to an original server computer actually requested by the client for the data transfer.

The server data request measurement means 15 has a function to measure the number of times a data request, destined for a server computer, sent from a client received by the data request reception means 13 has been received by this transfer-destination server computer within a specific period in the past.

The threshold value holding means 17 has a function to hold the predetermined number of times of the request as a threshold value.

The threshold value comparison means 16 has a function to compare the number of times of the request measured by the server data request measurement means 15 and a threshold value of the number of times of the data request held in the threshold value holding means 17 to each other and then transmit a comparison result to the data request transmission means 14.

FIG. 3 is a table for showing one example of information stored in the threshold value holding means 17 of the server computer protection apparatus 10 described above, in which case it holds a network address of each of server computers to be protected and the number of times of the data request that can be processed by each of these server computers for each unit time (one minute in this case).

In the server computer protection apparatus having this configuration, it is supposed that in the threshold value holding means 17 are there held each of such server computers as shown in FIG. 2 to be protected and threshold values which indicate the number of times of the data request that can be processed by each of these server computers. That is, in an example shown in FIG. 3, as the protection-subject server computers are there present a server computer having network address "192.168.1.31" and that having network address "192.168.1.32" and also are there held threshold values "100" and "150" of the server computers having network addresses "192.168.1.31" and "192.168.1.32" respectively as the number of processable data requests within a unit time (one minute in this case).

It is here supposed that in this condition a certain client has sent a data request to the server computer having network address "192.168.1.31".

A packet of the data request received by the network interface 11A is obtained by the data request reception means 13 on behalf of a server. The data request reception means 13 also responds to a connection request sent from clients. In this case, such a method is available that the data request reception means 13 uses as it is a network address of the server computer having network address "192.168.1.31" to thereby receive the data request sent from the client and also such a method is available that the client is explicitly notified of a different network address beforehand so that the client can send a data request destined for the server computer having network address "192.168.1.31" to this different network address to thereby permit the data request reception means 13 to receive this data request instead of the server.

The data request thus received by the data request reception means 13 is passed over to the data request transmission means 14. The server data request measurement means 15 measures beforehand the number of times the data request has been received, within a past constant period, by a server computer to which the data request is to be transferred.

In this case, it is supposed that at a moment when the data request received by the data request reception means 13 is passed over to the data request transmission means 14, the number of times the data request has been received by the server computer having network address "192.168.1.31" within a past one minute is measured by the server data request measurement means 15 is "85".

In this condition, the data request transmission means 14 makes an inquiry to the threshold value comparison means 16. The threshold value comparison means 16 compares and collates a threshold value "100" of the server computer having network address "192.168.1.31" held in the threshold value holding means 17 and the number of times of the data request of "85" measured by the server data request measurement means 15 to each other and then passes over to the data request transmission means 14 a comparison result which indicates that the measured number of times of the data request is not more than the threshold value because the number of times of the data request of "85" measured by the server data request measurement means 15 is not in excess of the threshold value "100" of the server computer having network address "192.168.1.31".

When having received from the threshold value comparison means 16 the comparison result indicating that the measured number of times of the data request is not more than the threshold value, the data request transmission means 14 sends (transfers) a packet of the data request to the server computer having network address "192.168.1.31" through the network interface 11B. In this case, the data request transmission means 14 processes also a request for connection to the server computer.

The server computer having network address "192.168.1.31" sends data corresponding to the data request received from the client through the server computer protection apparatus 10. This data thus sent from the server computer is received through the network segment (B) by the network interface 11B and then passed through the network interface 11A over to the requesting client. In this case, if the client is explicitly notified beforehand of a different address used by the data request reception means 13, the data to be sent from the network interface 11A to the client is sent thereto actually in a form of response from this different address. Furthermore, in a case where such a method is employed that the data request reception means 13 uses as it is the network address of the server computer having network address "192.168.1.31" to thereby receive a data request sent from the client, the data from the server computer having network address "192.168.1.31" received by the network interface 11B is sent to the requesting client through the network interface 11A after a header's port No., a sequence No., a check sum of a packet which carries the data are rewritten.

In such a manner, a data request sent from the client is sent to the server computer, which in turn passes data corresponding to the request over to the client.

Next, it is supposed that at another moment, when a data request received by the data request reception means 13 is passed over to the data request transmission means 14, the number of times, measured by the server data request measurement means 15, a data request has been received by the server computer having network address "192.168.1.31" within the past one minute is, for example, "103". In this condition, the data request transmission means 14 makes an inquiry to the threshold value comparison means 16. The threshold value comparison means 16 compares and collates the threshold value of "100" of the server computer having network address "192.168.1.31" held in the threshold value holding means 17 and the number of times of the data request of "103" measured by the data request measurement means 15 to each other and then passes over to the data request transmission means 14 a comparison result which indicates that the measured number of times of the data request has exceeded the threshold value because the number of times of the data request of "103" measured by the server data request measurement means 15 is in excess of the threshold value of "100" of the server computer having network address "192.168.1.31" held in the threshold value holding means 17.

When having received from the threshold value comparison means 16 the value of comparison which indicates that the measured number of times of the data request is in excess of the threshold value, the data request transmission means 14 abandons the packet of the data request received from the data request reception means 13.

The conventional server computer protection apparatus described above, however, has the following problems. That is, the conventional server computer protection apparatus needs to set as a threshold value beforehand the number of times of the data request that can be processed by each of server computers within a specific period. However, since the number of times of the data request that can be processed by the server computer within the constant period depends largely on the contents of a data request etc., it is difficult to set an appropriate threshold value, so that if a misappropriate threshold value is set, such a problem occurs that the server computer cannot be protected or, even if it can be protected, the throughput of the server cannot be utilized to the full.

Although such a server computer protection apparatus may be contemplated that, in order to set the threshold value automatically, a time lapse required to receive a response from a server computer is measured so that if no response is received within a specific time, it can be decided that the number of times of the data request that can be processed by a server is exceeded, to thus use the average number of times of the data request acquired at this moment as a threshold value or that a server is mounted thereon with means for measuring a load of a server computer so that the average number of times of the data request acquired at a moment when the load on the server computer has reached at least a constant value may be used as a threshold value, if the number of requests from a client has increased rapidly nevertheless, the average number of the data request becomes far distant in value from the number of times of the data request that can be processed by the server in the specific period, so that if the average number of times of the data request is used as the threshold value, there would occur such a problem that the throughput of the server cannot be utilized to the full or the server cannot be protected.

BRIEF SUMMARY OF THE INVENTION

It is an object of the present invention to provide a server computer protection apparatus and method for controlling data transfer by the same which can protect a server computer and also utilize a throughout of servers effectively even if a user does not set the number of times of the data request that can be processed by each of the servers.

It is another object of the present invention to realize, in a server computer protection apparatus which measures the number of times a data request is sent from a client to a server for each unit time and, in accordance with a result of comparison between a measured value and a threshold value, suspends the data request thus received or transfers the same to a request-destination server computer, a data transfer control mechanism which variably controls the threshold value voltage dynamically based on a suspension condition of the received data request and a condition of a response sent from a server when the data request is sent to the server and, if an amount of data requests destined for a server computer which has replaced the client in reception has increased rapidly, suppresses the rapid increase in an amount of data requests transferred from the server computer protection apparatus to the server computer within a predetermined variable range.

That is, the present invention provides a server computer protection apparatus which receives a data request sent from a client on behalf of a server, measures the number of times the data request has been received, within a past specific period, by a server computer to which the data request thus received from the client is to be transferred, compares the measured number of times of the data request to a threshold value, and, in accordance with a result of the comparison, suspends the data request received or transfers the same to the request-destination server computer with means which variably controls the threshold value based on a suspended condition of the data request received and a condition of a response acquired from a server to which the data request is sent.

It is a further object of the present invention to provide a server computer protection apparatus which comprises request reception means which receives a data request sent from a client on behalf of a server; measurement means which measures the number of times the data request has been received, within a past specific period, by a server computer to which the data request sent from the client and received by the request reception means is to be transferred; threshold value outputting means which outputs a threshold value to which the number of times of the data request measured by the measurement means is to be compared; comparison means which compares the number of times of the data request measured by the measurement means to a threshold value output from the threshold value outputting means; and data request transmission means which, if a result of comparison by the comparison means indicates that the number of times of the data request measured by the measurement means is in excess of the threshold value, suspends the data request received by the request reception means and, if the number of times of the data request measured by the measurement means is not in excess of the threshold value, transfers the data request received by the request reception means to the server computer, in which the threshold value outputting means is provided with suspension counting means which counts the number of times the data request received by the request reception means has been suspended within a specific time; server response measurement means which measures a time required to receive a response from a server computer which has received the data request sent from the data request transmission means; time-out counting means which counts the number of times a required time measured by the server response measurement means has exceeded a predetermined specific time within a past specific time; and threshold value counting means which receives a count value from the suspension counting means for each specific time and, if the count value from the suspension counting means is not more than a specific value, subtracts a value of the holding means at a specified subtraction ratio and, if the count value of the suspension counting means is in excess of the specific value and a count value of the time-out counting means is not more than a specific value, adds to the value of the holding means at a specified addition rate, whereby the data request transmission means controls the transmission of the received data request based on a dynamic threshold value output from the threshold value counting means provided to the threshold value outputting means.

It is a still further object of the present invention to provide a data transfer controlling method which comprises the steps of receiving a data request sent from a client on behalf of a server, measuring the number of times the data request, destined for a server computer, received from the client has been received by the server computer within a past specific period, comparing the measured number of times of the data request to a threshold value, and, in accordance with a result of the comparison, suspending the data request received or transferring the same to the request-destination server computer, in which the threshold value is variably controlled dynamically based on a suspension condition of the data request received and a condition of a response sent from a server which has received the data request, to thereby, if an amount of data requests transferred to a server computer which has replaced the client in reception has increased rapidly, suppress the rapid increase in an amount of data requests transferred from the server computer protection apparatus to the server computer within a predetermined variable range.

Thus, provision of the data transfer control function of the present invention makes it possible to realize a server computer protection apparatus which can protect a server computer and utilize a throughout of servers to the full even if a user does not set the number of times of the data request that can be processed by each of the servers. Furthermore, it is possible to realize a server computer protection apparatus which can protect a server computer and also utilize a throughput of the server to the full even if there occurs a rapid increase in number of requests sent from a client.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
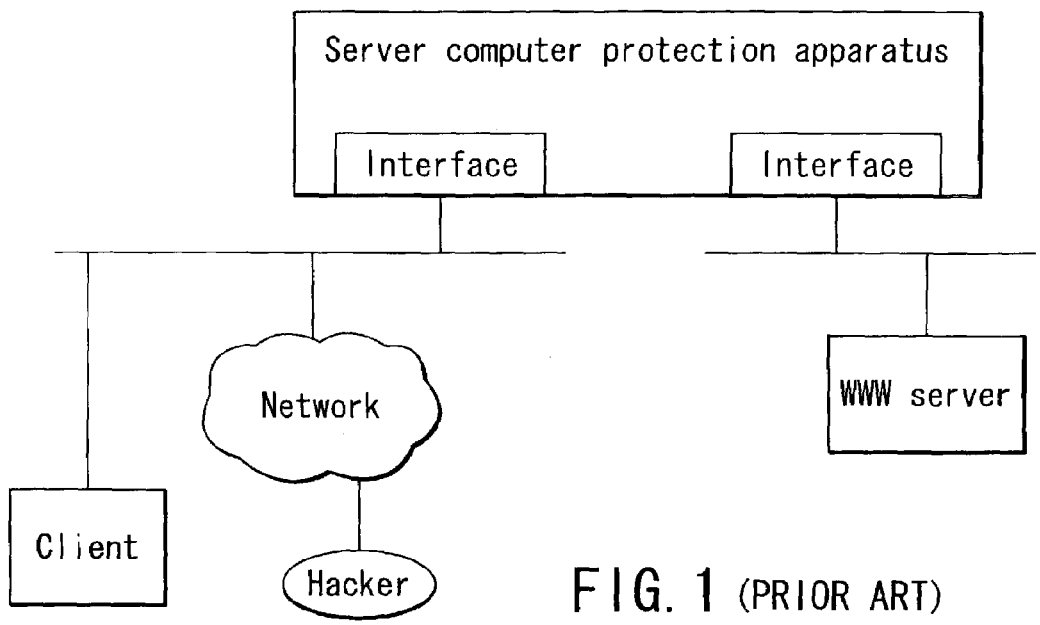
FIG. 1 is a system block diagram for showing a positional relationship among a packet switched network, a server, and a server computer protection apparatus.
Figure 2:
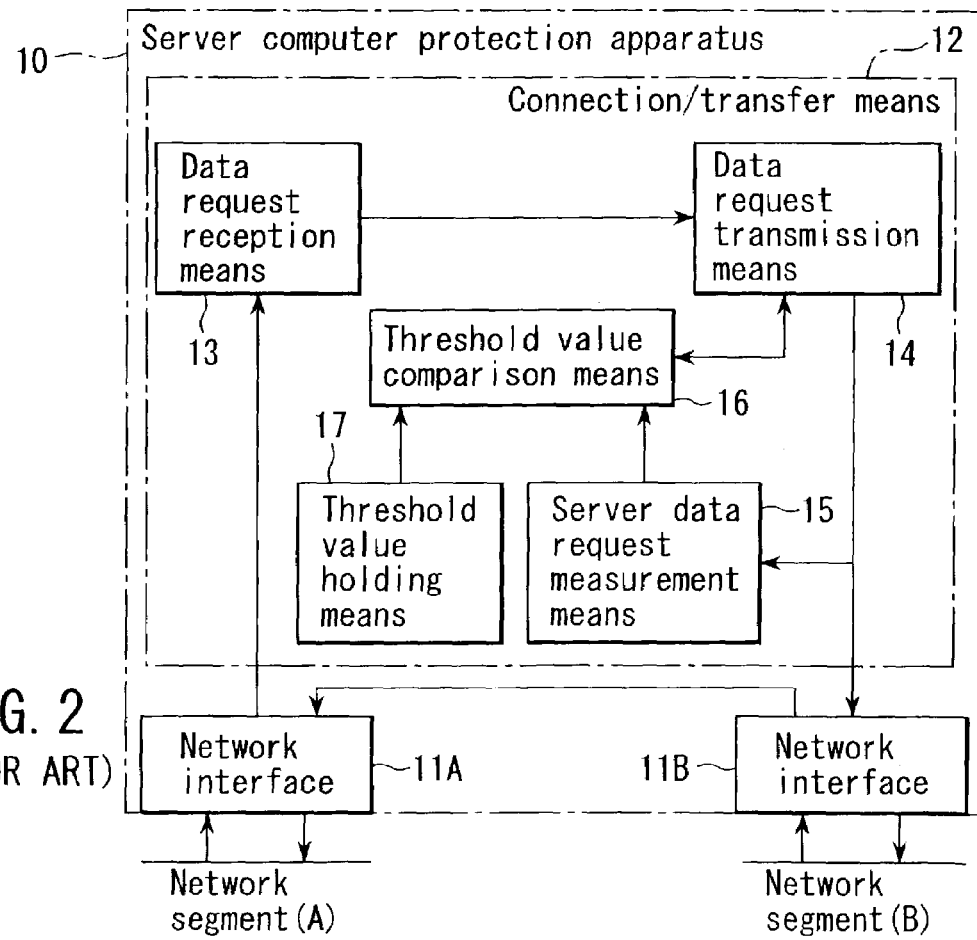
FIG. 2 is a block diagram for showing a configuration of a conventional server computer protection apparatus.
Figures 3, 4:
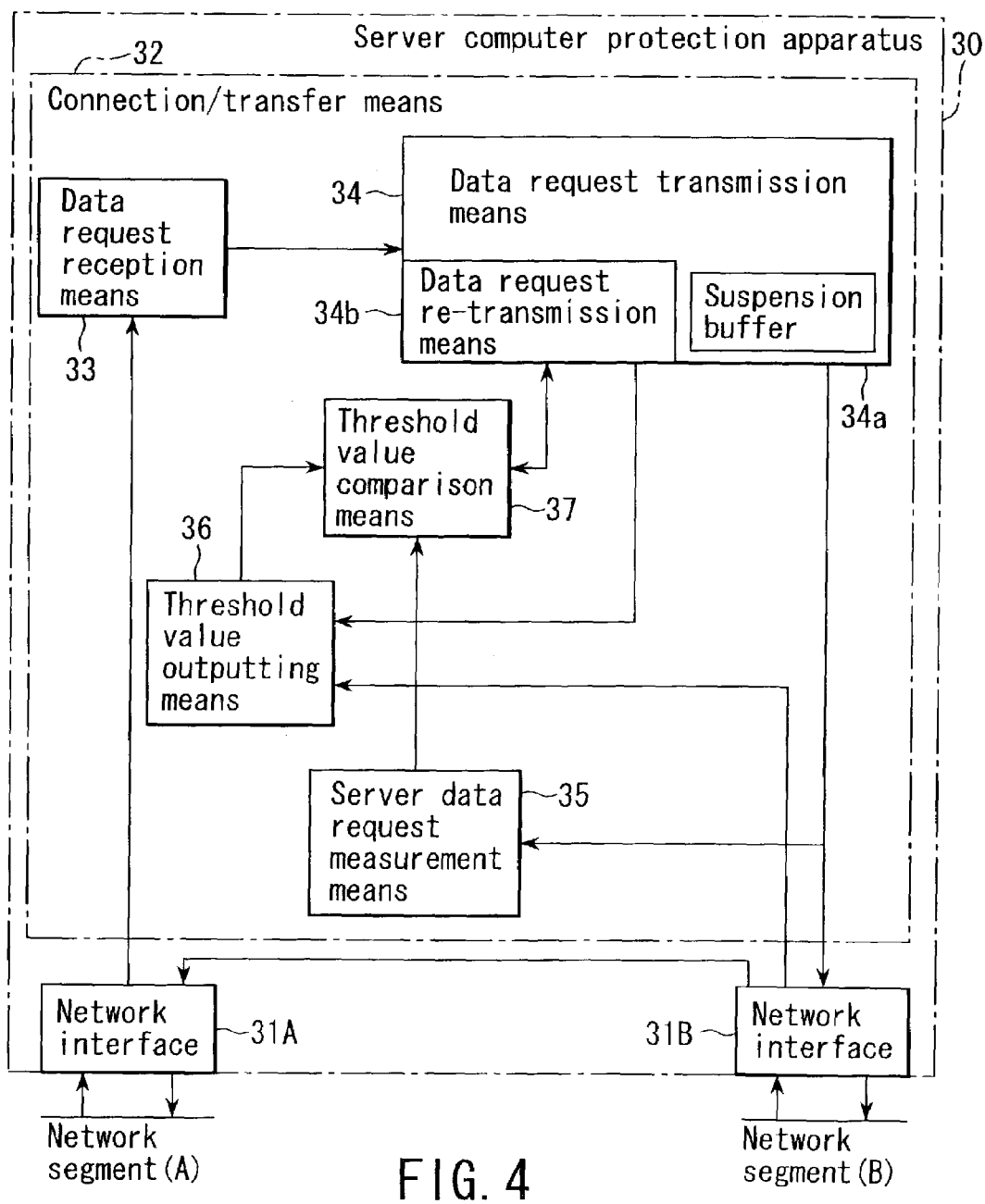
FIG. 3 is a table for showing one example of contents stored in threshold value holding means of the server computer protection apparatus 10.
FIG. 4 is a block diagram for showing a configuration of a server computer protection apparatus according to one embodiment of the present invention.

FIG. 4 is a block diagram for showing a configuration of a server computer protection apparatus according to a first embodiment of the present invention.

A server computer protection apparatus 30 according to the first embodiment of the present invention shown in FIG. 4 comprises network interfaces 31A and 31B and connection/transfer means 32.

The network interface 31A has a function to transmit a packet to and receive it from a client through a network segment (A). The network interface 31B has a function to transmit a packet to and receive it from a server computer through a network segment (B) and a function to send a packet of data requests passed from a data request transmission means 34 provided to the connection/transfer means 32 to the server computer and receive data from the server computer.

The connection/transfer means 32 is made up of data request reception means 33, data request transmission means 34, server data request measurement means 35, threshold value comparison means 37, and threshold value outputting means 36.

In the connection/transfer means 32, the data request reception means 33 has a function to exchange a packet with the network interface 31A and receive a server, a data request sent from a client on behalf of a server.

The data request transmission means 34 has a function to receive a comparison result from the threshold value comparison means 37 and, if the number of times a data request has been received which is measured by the server data request measurement means 35 is not in excess of a threshold value output from the threshold value outputting means 36, transfer through the network interface 31B a packet of the data request received by the data request reception means 33 to an original server computer actually requested by the client for data transfer and, if the number of time of the data request has been received which is measured by the server data request measurement means 35 is in excess of the threshold value output from the threshold value outputting means 36, suspend in a suspension buffer 34a the packet of the data request received by the data request reception means 33. Data request re-transmission means 34b has a function to make an attempt again to send data requests suspended in the suspension buffer 34a to the server computer after different time lapses thereof have elapsed.

The server data request measurement means 35 has a function to measure the number of times a data request received by the data request reception means 33 has been received, within a constant period, by a request-destination (transfer-destination) server to which the data request is to be transferred.

The threshold value comparison means 37 has a function to compare the number of times of the data request measured by the server data request measurement means 35 to a threshold value output from the threshold value outputting means 36 and post a result of the comparison to the data request transmission means 34.

The threshold value outputting means 36 is provided with server response measurement means, time-out counting means, suspension counting means, and threshold value counting means, to variably set dynamically and then output a threshold value of the above-mentioned number of times of the data request based on a condition of data requests suspended in the data request transmission means 34, a condition of a response sent from a server computer, etc.

Figure 5:
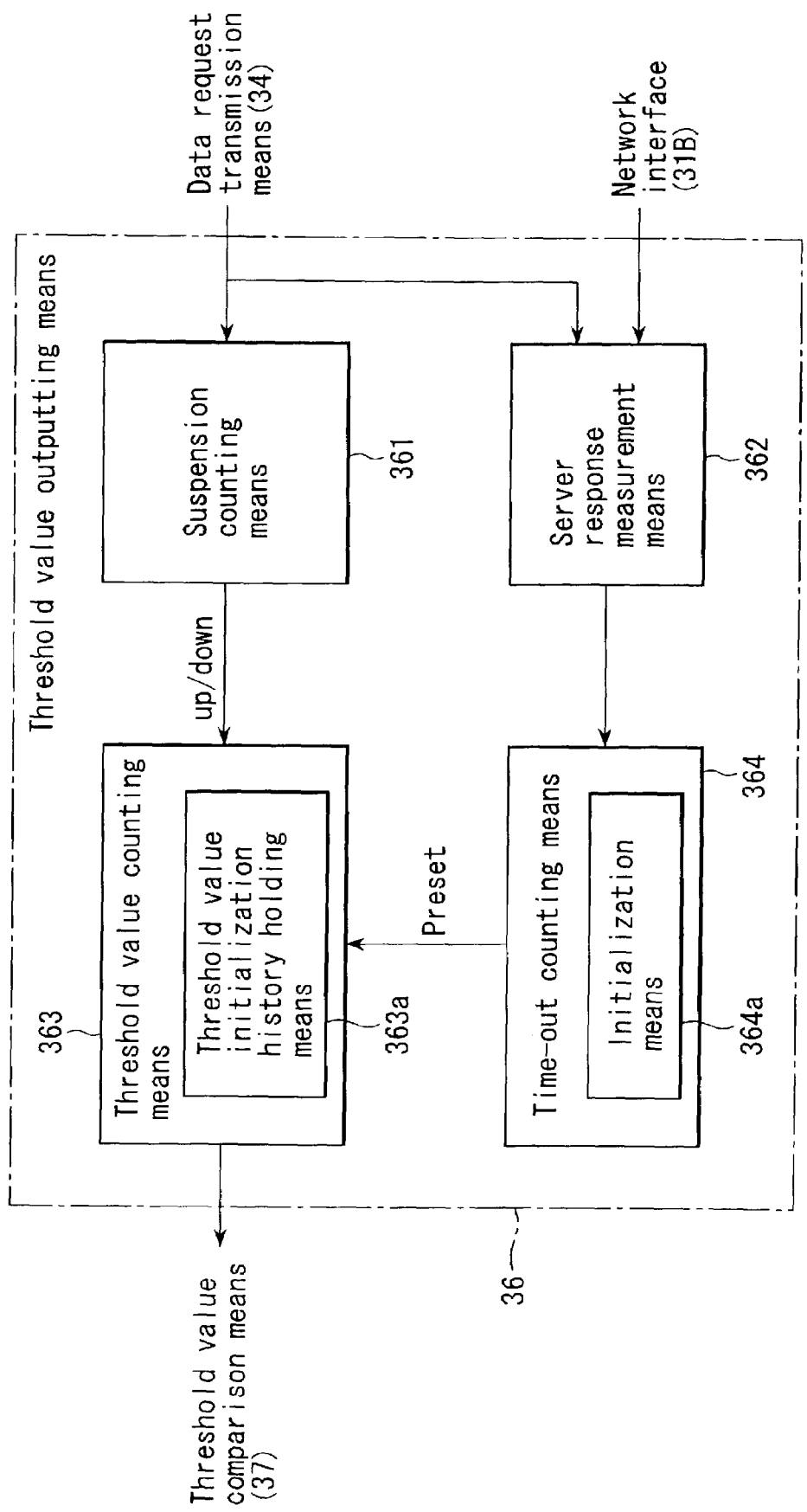
FIG. 5 is a block diagram for showing a configuration of threshold value outputting means according to the embodiment of FIG. 4.

FIG. 5 is a block diagram for showing an internal configuration of the threshold value outputting means 36, which is provided with suspension counting means 361, server response measurement means 362, threshold value counting means 363, and time-out counting means 364.

The suspension counting means 361 counts the number of times a data request has been suspended in the data request transmission means 34 within a past specific period and sends a count value as an addition/subtraction control signal (up/down) to the threshold value counting means 363.

The server response measurement means 362 measures a required time from a moment when the data request transmission means 34 has sent a data request packet to a moment when a response has been received from a server computer and sends the information of the measured time to the time-out counting means 364.

The threshold value counting means 363 has a function to receive a count value output from the suspension counting means 361 as the addition/subtraction control signal (up/down) and also measured time information output from the time-out counting means 364 and, based on these received information items, conduct addition/subtraction on such a value as to provide a threshold value periodically and then send a resultant count value as the threshold value to the threshold value comparison means 37. Furthermore, the threshold value counting means 363 has threshold value initialization history holding means 363a which holds a count value of the threshold value counting means when it is initialized.

The time-out counting means 364 has a function to count, for each past specific time, the number of times a measured time indicated by measured time information output from the server response measurement means 362 has exceeded a predetermined time and, when a count value of this number of times has exceeded the predetermined number of times, send an initialization control signal (preset) to the threshold value counting means 363. Furthermore, the time-out counting means has initialization means 364a which counts the number of times a required time measured by the server response measurement means 362 has exceeded a preset specific time within a past specific time and, when a count value of this number of times has exceeded a specific value, initializes the value of the threshold value counting means 363 using a value between a pre-specified minimum value and a current count value.

The following will explain the operations of a server computer protection apparatus related to the present invention with reference to FIGS. 4 and 5 mentioned above.

When a client sends a data request to a server computer, the data request is received through the network segment (A) to the network interface (31A).

The data request thus received by the network interface 31A is then obtained by the data request reception means 33 on behalf of the server computer. At the same time, the data request reception means 33 also responds to a connection request sent from the client. The data request reception means 33 passes the data it has obtained over to the data request transmission means 34.

When having received the data request from the data request reception means 33, the data request transmission means 34 acquires a comparison result from the threshold value comparison means 37 and, according to the contents, decides whether a packet of the data request received by the data request reception means 33 is to be suspended or transferred to the request-destination server computer.

At this moment, in processing by the threshold value comparison means 37, the server data request measurement means 35 has measured the number of times the data request has been received by the request-destination server within a past specific period.

When having been inquired about a comparison result sent from the data request transmission means 34, first the threshold value comparison means 37 acquires a current threshold value from the threshold value outputting means 36, acquires the measured number of times of the data request from the server data request counting means 35, compares this acquired threshold value to the measured number of times, and passes a result of this comparison over to the data request transmission means 34.

If the result of the comparison acquired from the threshold value comparison means 37 indicate that the number of times of the data request measured by the server data request measurement means 35 is in excess of the threshold value, the data request transmission means 34 suspends the data request received from the data request reception means 33.

When the data request transmission means 34 has thus suspended the data request, the threshold value outputting means 36 is notified of that.

In the threshold value outputting means 36, the suspension counting means 361 always counts the number of data requests (the number of data request packets) suspended by the data request transmission means 34 and so counts up by one (+1) each time it is notified by the data request transmission means 34 of suspension of a data request thereby. The count value of this suspension counting means 361 is sent to the threshold value counting means 363 as the addition/subtraction control signal (up/down).

The threshold value counting means 363 periodically monitors the count value that it receives from the suspension counting means 361 as the addition/subtraction control signal. If the count value monitored is equal to or less than a prescribed value, the means 363 determines that the threshold value is large for the amount of data requested, and the count value is decreased at a predetermined subtraction ratio. If the count value monitored exceeds the prescribed value, the means 363 determines that the threshold value is small for the amount of data requested, and the count value is increased at a predetermined addition ratio. The count value, either decreased or increased, is output as new threshold value to the threshold value compensation means 37.

Thus, to follow up a variation in an amount of data requests, the threshold value can be subjected to addition/subtraction at a specified addition/subtraction ratio, to protect a server computer by preventing a rapid increase, if any, in number of requests (the number of times of the data request) to be sent from a client to the server computer.

Further, if the contents of the comparison result indicate that the number of times of the data request measured by the server data request measurement means 35 is less than the threshold value, the data request transmission means 34 sends the data request received from the data request reception means 33 through the network interface 31B to an original server computer requested by the client for data transfer.

At the same time, the data request transmission means 34 also processes a request for connection to the server computer. The server computer sends data according to the data request it has received. The data thus sent from the server computer is received by the network interface 31B, transmitted from the network interface 31A, and passed over to the data requesting client through the network interface 31A.

In this data request transfer processing, the server response measurement means 362 provided to the threshold value outputting means 36 measures a required time from a moment when the data request transmission means 34 has sent a packet related to a data request to a moment when a response has been received from the server computer and sends information of a measured time to the time-out counting means 364.

The time-out counting means 364 calculate the number of times it has decided that the measured time received from the server response measurement means 362 exceeds a pre-set specific time. Furthermore, if the number of times exceeds the predetermined number of times, it sends the initialization control signal (preset) to the threshold value counting means 363.

When having received the initialization signal (preset) from the time-out counting means 364, the threshold value counting means 363 initializes its own count value to be output as the threshold value to a value between a preset minimum value and a current count value, for example, an intermediate value therebetween.

In the threshold value counting means 363, a count value to be output as the threshold value undergoes the following addition/subtraction by use of the number of data requests sent from the client (the number of data requests received by the data request reception means 13) and a count value of the suspension counting means 361.

In such a manner, it is possible to realize a server computer protection apparatus which can protect a server computer and utilize a throughout of the servers to the full even if a user does not set the number of times of the data request that can be processed by each of server computers. Furthermore, it is possible to realize a server computer protection apparatus which can protect a server computer and utilize a throughput of the servers to the full even if there occurs a rapid increase in number of requests (the number of times of the data request) sent from a client.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A server computer protection apparatus comprising:
   request reception means for receiving, on behalf of a server computer, a data request sent from a client and destined for the server computer;
   measurement means for measuring the number of times the data request has been received by the server computer within a past specific period;
   comparison means for comparing the number of times the data request has been received by the server computer to a dynamic threshold value; and
   data request transmission means for:
   suspending the data request if the comparison indicates that the number of times the data request has been received is in excess of the threshold value, and
   sending the data request to the server computer if the comparison indicates that the number of times the data request has been received is not in excess of the threshold value;
   threshold value outputting means, comprising:
   suspension counting means for counting the number of times the data request has been suspended within a constant period;
   server response measurement means for measuring a server response time from a moment when the data request is sent to the server computer to a moment when a response is received from the server computer;

time-out counting means for counting the number of times the server response time has exceeded a predetermined time within a past specific time and signaling an initialization when the number of times exceeds a predetermined number;

threshold value counting means for:
  decreasing the threshold value by a specified subtraction ratio if the number of suspensions is not more than a predetermined value,
  increasing the threshold value by a specified addition ratio if the number of suspensions is in excess of the predetermined value, and
  setting the threshold value to an intermediate value between the threshold value and a minimum threshold value when an initialization is signaled; and threshold value initialization history holding means for holding a history of the threshold value when the threshold value is set to the intermediate value;

wherein the addition ratio and the subtraction ratio are determined based on the history, and the data request transmission means controls the transmission of the received data request based on the threshold value.

2. The server computer protection apparatus according to claim 1, wherein the data request transmission means includes means for attempting again to send the suspended data requests to the server computer after different time lapses thereof have elapsed.

3. A data transfer method comprising the steps of:
  receiving a data request sent from a client and destined for a server;
  measuring the number of times the data request has been received by the server computer within a past specific period;
  comparing the number of times the data request has been received to a dynamic threshold value; and
  suspending the data request if the comparison indicates that the number of times the data request has been received is in excess of the threshold value;
  sending the data request to the server computer if the comparison indicates that the number of times the data request has been received is not in excess of the threshold value;
  counting the number of times the data request has been suspended within a constant period;
  measuring a server response time from a moment when the data request is sent to the server computer to a moment when a response is received from the server computer;
  signaling an initialization when the server response time has exceeded a predetermined response period more than a predetermined number of times within a past specific time;
  decreasing the threshold value by a specified subtraction ratio if the number of suspensions is not more than a predetermined value;
  increasing the threshold value by a specified addition ratio if the number of suspensions is in excess of the predetermined value;
  setting the threshold value to an intermediate value between the threshold value and a minimum threshold value when an initialization is signaled;
  controlling the transmission of the received data request based on the threshold value; and
  holding a history of the threshold value when an initialization is signaled, wherein the addition ratio and the subtraction ratio are determined based on the history.

4. The data transfer method of claim 3, further including attempting again to send the suspended data requests to the server computer after different time lapses thereof have elapsed.

* * * * *